(12) United States Patent  
Asterlin

(10) Patent No.: US 7,857,144 B1  
(45) Date of Patent: Dec. 28, 2010

(54) LIQUID FILTER

(75) Inventor: Gunther E. Asterlin, South Bend, IN (US)

(73) Assignee: Filter Specialists, Inc., Michigan City, IN (US)

( * ) Notice: Subject to any disclaimer, the term of this patent is extended or adjusted under 35 U.S.C. 154(b) by 1136 days.

(21) Appl. No.: 10/894,838

(22) Filed: Jul. 20, 2004

(51) Int. Cl.  
*B01D 35/00* (2006.01)

(52) U.S. Cl. ...................................... 210/474

(58) Field of Classification Search ............ 210/167.03, 210/167.29, 222, 223, 323.1, 369, 371, 455, 210/695, 497.01, 474; 209/224, 312  
See application file for complete search history.

(56) References Cited

U.S. PATENT DOCUMENTS

| | | | | |
|---|---|---|---|---|
| 3,841,489 A | * | 10/1974 | Combest et al. | 210/223 |
| 3,931,015 A | * | 1/1976 | Jenkins | 210/232 |
| 4,067,810 A | * | 1/1978 | Sullivan | 210/223 |
| 4,133,769 A | * | 1/1979 | Morgan, Jr. | 210/455 |
| 4,946,589 A | * | 8/1990 | Hayes | 210/222 |
| 5,137,632 A | | 8/1992 | Morgan, Jr. | |
| 5,271,834 A | * | 12/1993 | Mondiny | 210/222 |
| 6,210,572 B1 | * | 4/2001 | Tulchinskiy | 210/223 |
| 6,299,768 B1 | * | 10/2001 | Okamoto | 210/695 |

FOREIGN PATENT DOCUMENTS

GB      2107600 A   *   5/1983

\* cited by examiner

*Primary Examiner*—Walter D Griffin  
*Assistant Examiner*—Denise R Anderson  
(74) *Attorney, Agent, or Firm*—Botkin & Hall, LLP

(57) ABSTRACT

This invention relates to a liquid filter having a housing and a top. The housing includes an inwardly protruding annular shoulder which supports a filter basket. Forming a part of the housing and located above the annular shoulder is a tapered protrusion over which a filter bag is press fitted and snapped under so as to be suggested against the underlying annular shoulder.

5 Claims, 1 Drawing Sheet

LIQUID FILTER

SUMMARY OF THE INVENTION

This invention relates to a liquid filter which may be formed from cylindrical tubing.

In the filter of this invention the housing sidewall includes an inwardly protruding annular shoulder which is utilized to support a filter basket and/or filter bag. The housing sidewall also includes an inwardly directed annular protrusion which is tapered and which is located adjacently above the housing shoulder. When the filter bag is located within the housing, it is cammed downwardly over the inwardly directed protrusion of the sidewall and snap fitted under the protrusion against the underlying shoulder or filter basket if the basket is utilized in conjunction with the filter bag. In this manner, the filter bag is securely retained within the filter housing.

Accordingly, it is an object of this invention to provide a liquid filter in which the filter housing is formed from cylindrical tubing.

Another object of this invention is to provide a filter having a housing with a uniform thick sidewall incorporating an inwardly protruding annular shoulder and an inwardly protruding annular protrusion adjacently spaced from the shoulder for the purpose of accommodating a filter bag located restrictively between the shoulder and protrusion.

And still another object of this invention is to provide a liquid filter which is of economical construction.

Further objects of this invention will become apparent upon reading the following description.

DESCRIPTION OF THE PREFERRED EMBODIMENT

Figure 1:
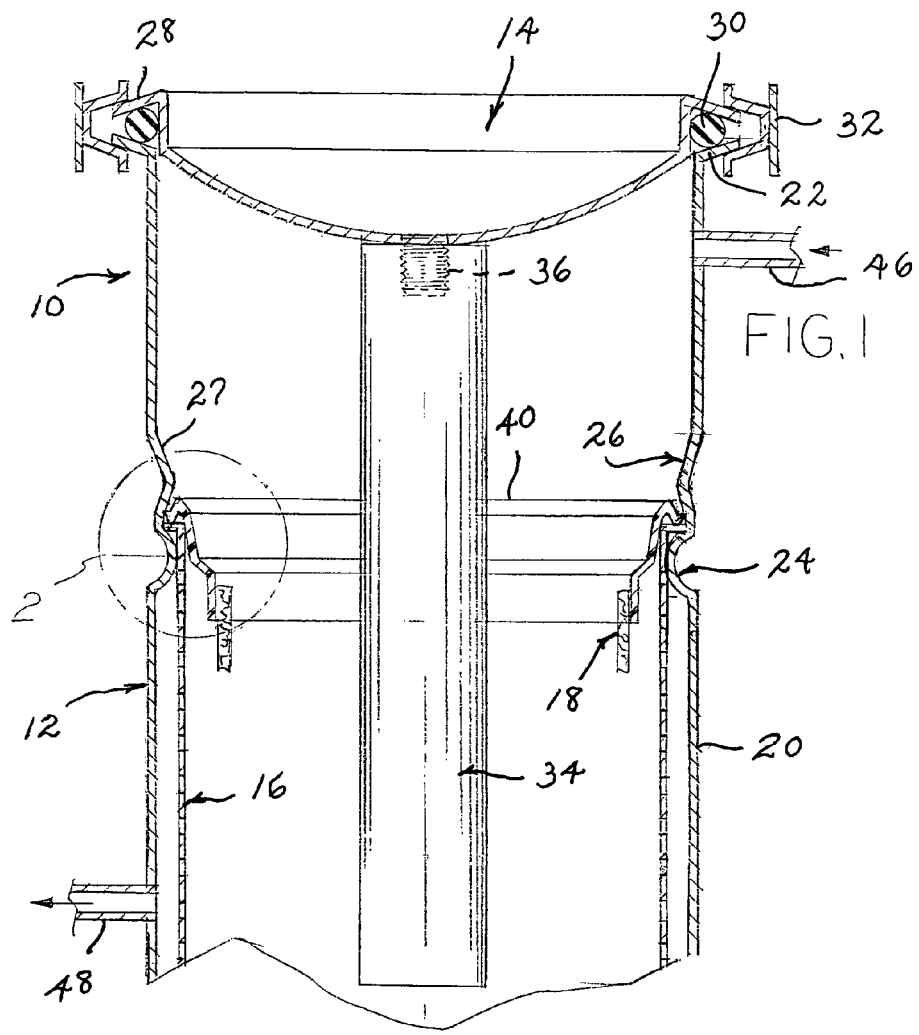
FIG. 1 is a fragmentary longitudinal sectional view of the filter.
Figure 2:
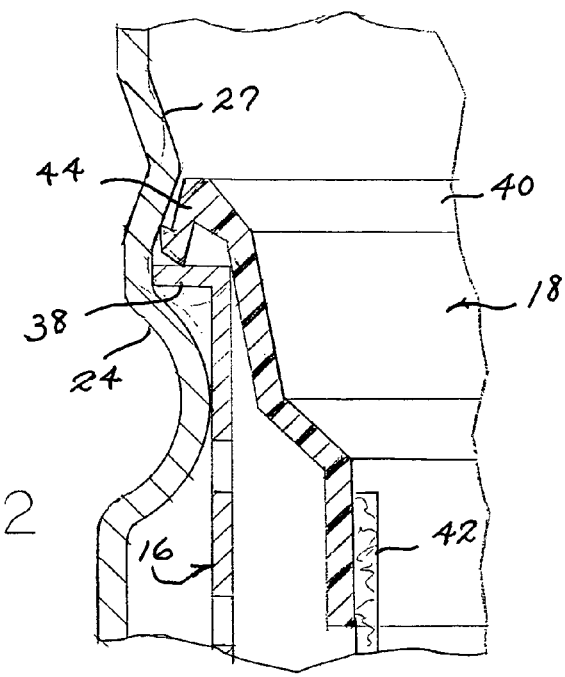
FIG. 2 is a detailed fragmentary sectional view seen within broken line circle 2 of FIG. 1.

Filter 10 includes a housing 12 and a top 14. Located within filter 10 is a basket 16 and a filter bag 18. Housing 12 includes a sidewall 20 enclosed at its lower end and having an opening at its upper end defined by an outturned peripheral flange 22. Sidewall 20 is of uniform thickness, having an in-turned annular arcuate shoulder 24 formed in it. An inwardly tapered annular protrusion 26 is formed in sidewall 20 adjacently above shoulder 24. Protrusion 26 includes a downwardly tapered surface 27. An inlet port 46 is formed in housing sidewall 20 above protrusion 26 and an outlet port 48 is formed in the sidewall below the shoulder 24.

Top 14 includes an out-turned peripheral flange 28 and is designed, as shown in FIG. 1, to be fitted across the upper opening in housing 12 with an o-ring 30 seated between flange 22 of the housing sidewall and flange 28 of top 14. To secure the top 14 to housing 12, a clamp 32 is applied about and in compressive contact with flanges 22 and 28 so as to compress seal 30 between the flanges. In the preferred embodiment shown, a magnet 34 is secured to top 14 by being threaded onto a stud 36 carried by the top so as to protrude inwardly into the housing. Magnet 34 is located between inlet 46 and outlet 48.

Basket 16 is used to support the filter bag 18 and is of reticulated, rigid form having an outturned upper flange 38. Basket 16 fits within housing 12 with its upper flange 38 resting upon shoulder 24. Filter bag 18 includes an upper liquid impervious ring 40 which is flexible yet shape-retaining. Bag 18 includes a body 42 which is connected to ring 40 and which is formed of a liquid pervious filtering material such as described in U.S. Pat. No. 5,137,632, incorporated herein by reference. Ring 40 of bag 18 includes a beveled out-turned lip 44. With top 14 removed, bag 18 can be inserted into filter housing 12 with its out-turned lip 44 contacting and being cammed over housing protrusion 26 at its inwardly tapering surface 27, flexing slightly inwardly until lip 44 is snap fitted under the protrusion which preferably holds the bag at its ring downwardly against flange 38 of the underlying basket. In this manner, the filter bag is firmly retained within the filter housing in sealing engagement at its ring with housing sidewall 20 and against basket 16.

Liquid flow through the filter with top secured and sealed across the opening into the filter housing enters inlet 46, passing around magnet 34 which serves to remove any ferrite materials from the liquid and then downwardly into filter bag 18 and out the filter bag, exiting the filter through outlet 48.

Filter housing 12 is preferably formed from tubular stock having a uniform thickness. Shoulder 24, and protrusion 26 are formed in the sidewall of the housing preferably by rolling. A bottom is then added to the lower edge of the sidewall to form the enclosed housing except for its open top. Flange 22 is also formed from the tubular stock with the inlet and outlet into the housing being appropriately welded to the normally stainless steel or other form of metal material forming the housing.

The invention is not to be limited to the details above given but may be modified within the scope of the appended claims.

The invention claimed is:

1. A liquid filter comprising a housing and a top, said housing including a sidewall defining an open end, said top removably spanning said end, said sidewall including an inwardly protruding annular arcuate shoulder, a liquid inlet into said housing and a liquid outlet from said housing, said sidewall including an inwardly directed annular protrusion adjacently spaced from said shoulder and located between the shoulder and said open end, a filter bag including a flexible annular ring, said bag fitted into said housing with said ring snap fitted under said protrusion adjacent to said shoulder spanning said sidewall between said liquid inlet and outlet, said protrusion tapered toward said shoulder to accommodate flexing of said bag ring as the ring is fitted under the protrusion.

2. The filter of claim 1 and a magnet carried by said top and extending into said housing between said liquid inlet and outlet.

3. A liquid filter comprising a housing and a top, said housing including a sidewall defining an open end, said top removably spanning said end, said sidewall including an inwardly protruding annular arcuate shoulder, a liquid inlet into said housing and a liquid outlet from said housing, said sidewall including an inwardly directed annular protrusion adjacently spaced and aligned over said shoulder and located between the shoulder and said open end, a filter bag including a flexible annular ring, said bag fitted into said housing with said ring snap fitted under said protrusion adjacent to said shoulder spanning said sidewall between said liquid inlet and outlet, said protrusion tapered toward said shoulder to accommodate flexing of said bag ring as the ring is fitted under the protrusion.

4. The filter of claim 3 wherein the sidewall is of uniform thickness with said shoulder and protrusion being formed from cylindrical tubing.

5. The filter of claim 3 and a rigid perforated basket having an out-turned peripheral flange, said basket fitted into said housing and having its flange supported upon said shoulder, said bag ring fitted between said flange and said protrusion.

* * * * *